(12) United States Patent
Shen et al.

(10) Patent No.: US 8,605,429 B2
(45) Date of Patent: Dec. 10, 2013

(54) ALL IN ONE COMPUTER

(75) Inventors: Chi-Kuan Shen, New Taipei (TW);
Shih-Wen Chiang, New Taipei (TW);
Cheng-Min Hung, New Taipei (TW);
Yu-Lang Chang, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 277 days.

(21) Appl. No.: 13/186,387

(22) Filed: Jul. 19, 2011

(65) Prior Publication Data

US 2012/0170197 A1 Jul. 5, 2012

(30) Foreign Application Priority Data

Dec. 29, 2010 (TW) .................................. 99146735

(51) Int. Cl.
*G06F 1/16* (2006.01)

(52) U.S. Cl.
USPC ....................... 361/679.55; 248/371; D14/337

(58) Field of Classification Search
USPC ........................ 361/679.55; 248/371; D14/337
See application file for complete search history.

(56) References Cited

U.S. PATENT DOCUMENTS

| | | | | |
|---|---|---|---|---|
| 5,175,672 | A * | 12/1992 | Conner et al. | 361/679.09 |
| 5,235,495 | A * | 8/1993 | Blair et al. | 361/679.26 |
| 6,651,943 | B2 * | 11/2003 | Cho et al. | 248/122.1 |
| 7,149,080 | B2 * | 12/2006 | Jackson, Jr. | 361/679.21 |
| 7,295,429 | B2 * | 11/2007 | Jackson, Jr. | 361/679.27 |
| 7,450,372 | B2 * | 11/2008 | Lin et al. | 361/679.55 |
| 7,502,222 | B2 * | 3/2009 | Cheng et al. | 361/679.55 |
| 7,909,295 | B2 * | 3/2011 | Powers et al. | 248/121 |
| 8,054,617 | B2 * | 11/2011 | Kuang et al. | 361/679.22 |
| 8,152,113 | B2 * | 4/2012 | Chen et al. | 248/150 |
| 8,400,767 | B2 * | 3/2013 | Yeom et al. | 361/679.59 |
| 2006/0049327 | A1 * | 3/2006 | Chen | 248/371 |
| 2006/0109617 | A1 * | 5/2006 | Chen et al. | 361/683 |
| 2007/0008686 | A1 * | 1/2007 | Jang | 361/681 |
| 2007/0235617 | A1 * | 10/2007 | Yukawa et al. | 248/371 |
| 2008/0024971 | A1 * | 1/2008 | Jackson, Jr. | 361/683 |
| 2011/0026216 | A1 * | 2/2011 | Liao et al. | 361/679.35 |
| 2011/0216493 | A1 * | 9/2011 | Zheng et al. | 361/679.21 |
| 2011/0222231 | A1 * | 9/2011 | Huang et al. | 361/679.21 |

* cited by examiner

*Primary Examiner* — Lisa Lea Edmonds
(74) *Attorney, Agent, or Firm* — Altis Law Group, Inc.

(57) ABSTRACT

An all in one computer includes an enclosure and a support module attached to the enclosure. The support module includes a leg stand rotatably attached to a rear panel of the enclosure about an axis perpendicular to the rear panel. The leg stand includes a shorter base and a longer base. An operation opening is defined in the leg stand and located adjacent to the longer base. The leg stand is rotatable between a first position where the longer base faces downward to support the enclosure, and a second position where the longer base faces upwards for facilitating using the operation opening to carry the all in one computer.

12 Claims, 4 Drawing Sheets

ALL IN ONE COMPUTER

BACKGROUND

1. Technical Field

The present disclosure relates to an all in one computer.

2. Description of Related Art

A typical all in one computer includes an enclosure which accommodates a display screen and a motherboard and a support module attached to the enclosure. The support module includes a base plate and a support leg. The base plate can be placed on a desk. The support leg had an upper end pivotably attached to a rear panel of the enclosure and a lower end securely attached to the base plate. A display angle of the all in one computer is adjustable since the leg stand is pivotaly attached to the enclosure about an axis that is parallel to the rear panel of the enclosure. However, the typical all in one computer does not allow users to carry it from place to place since the all in one computer has no handles.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation. In the figures of the accompanying drawings in which like references indicate similar elements. It should be noted that references to "an" or "one" embodiment in this disclosure are not necessarily to the same embodiment, and such references mean at least one.

Figure 1:
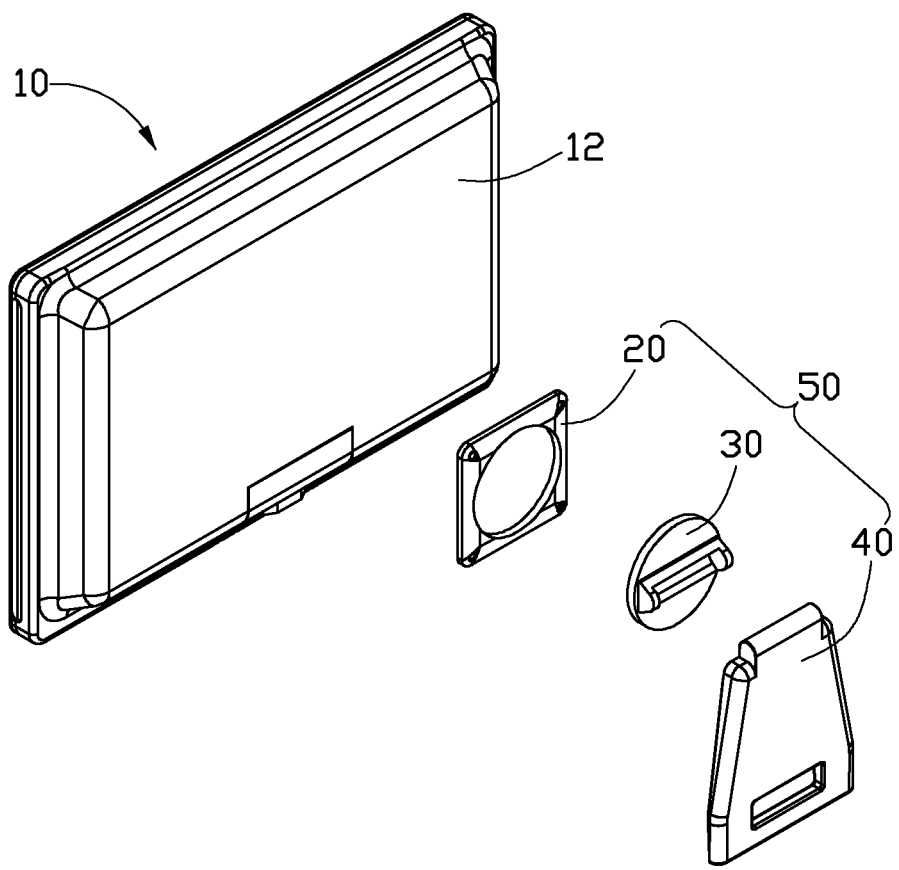
FIG. 1 is an exploded view of an all in one computer according to an embodiment.
Figure 2:
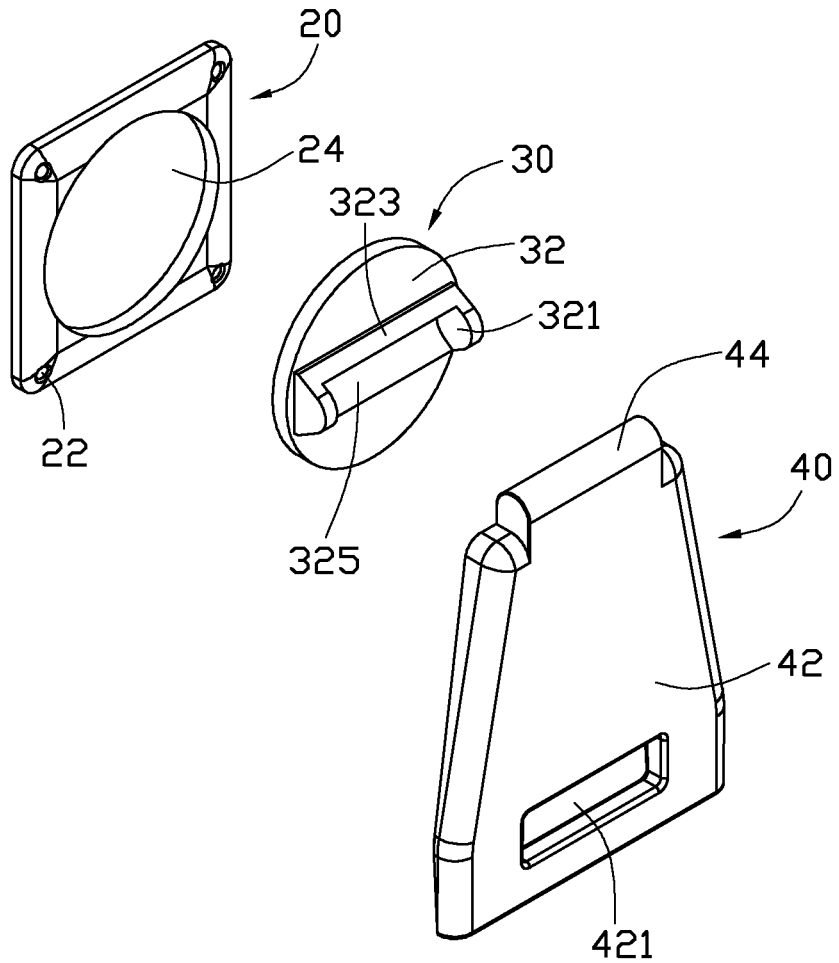
FIG. 2 is an enlarged view of a support module of FIG. 1.

Referring to FIGS. 1 and 2, an embodiment of an all in one computer includes an enclosure 10 and a support module 50 for supporting the enclosure 10. The enclosure 10 accommodates a display, a motherboard, and other computer hardware. The support module 50 includes a mounting piece 20, a connecting member 30, and a leg stand 40.

The mounting piece 20 has a square shape. Four securing holes 22 are defined in four corners of the mounting piece 20. A circular groove 24 is defined in a central portion of the mounting piece 20 for mounting the connecting member 30.

The connecting member 30 includes a circular main plate 32, a pair of tabs 321 perpendicularly extending from the circular main plate 32, and a pair of flanges 323 extending from the circular main plate 32 and connecting with the pair of tabs 321. A length of each of the pair of flanges 323 is substantially equal to a distance between the pair of tabs 321. A mounting groove 325 is located between the pair of tabs 321 and the pair of flanges 323. An inner surface of each of the pair of flanges 323 is an arc-shaped surface.

The leg stand 40 includes a main body 42 and a mounting portion 44 protruding from the main body 42. The main body 42 has an isosceles trapezoid shape. The main body 42 has a shorter base and a longer base which is parallel to and longer than the shorter base, and two side edges of equal length. The mounting portion 44 protrudes from the shorter base. The mounting portion 44 is narrower than the shorter base. An upper surface of the mounting portion 44 has an arc shape corresponding to the mounting groove 325. An operation opening 421 is defined in the main body 42 and located adjacent to the longer base.

Figure 3:
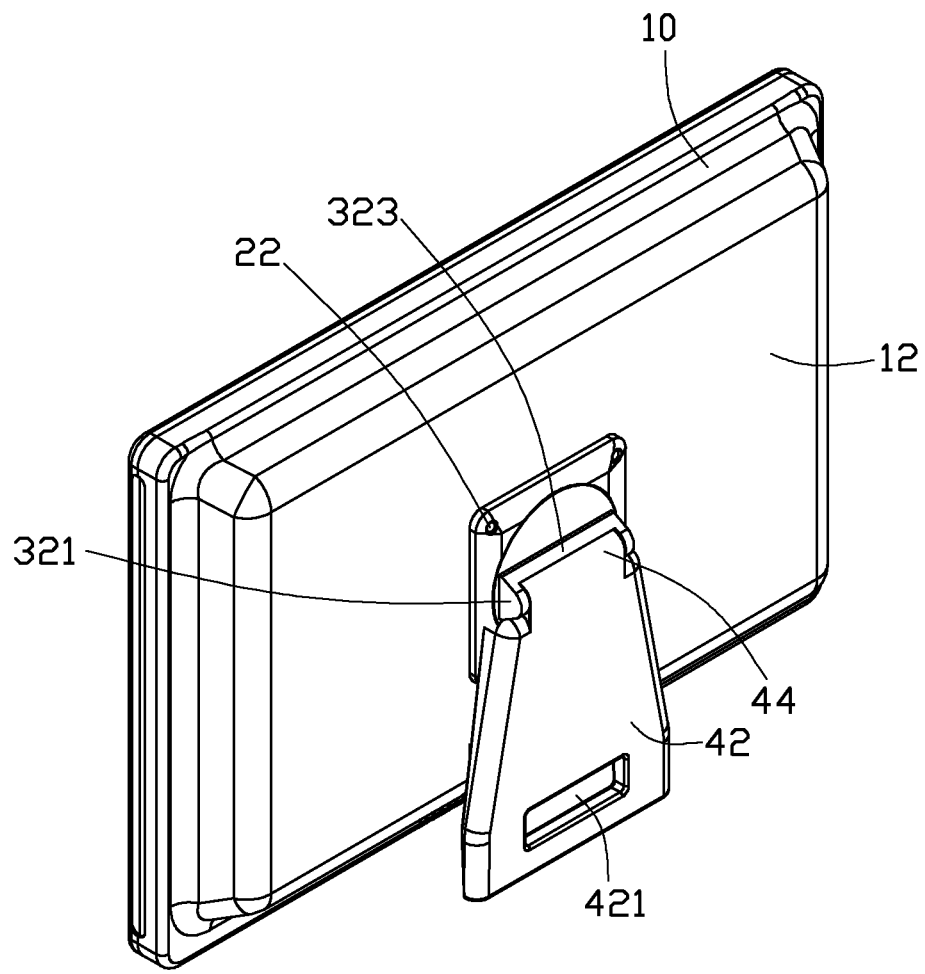
FIG. 3 is an assembled view of the all in one computer of FIG. 1, showing the support module at a first position.

Referring to FIG. 3, in assembly, screws (not shown) are engaged into the securing holes 22 to secure the mounting piece 20 on the rear panel 12. The circular main plate 32 is pivotably mounted in the circular groove 24. The mounting portion 44 is mounted in the mounting groove 325. In one embodiment, the connecting member 30 is pivotably engaged in the circular groove 24, and will not easily disengage from the circular groove 24. The mounting portion 44 is secured in the mounting groove 325, thereby the leg stand 40 can rotate together with the connecting member 30 about an axis perpendicular to the rear panel 12. The leg stand 40 can support the enclosure 10 in a first position where the longer base faces downward.

Figure 4:
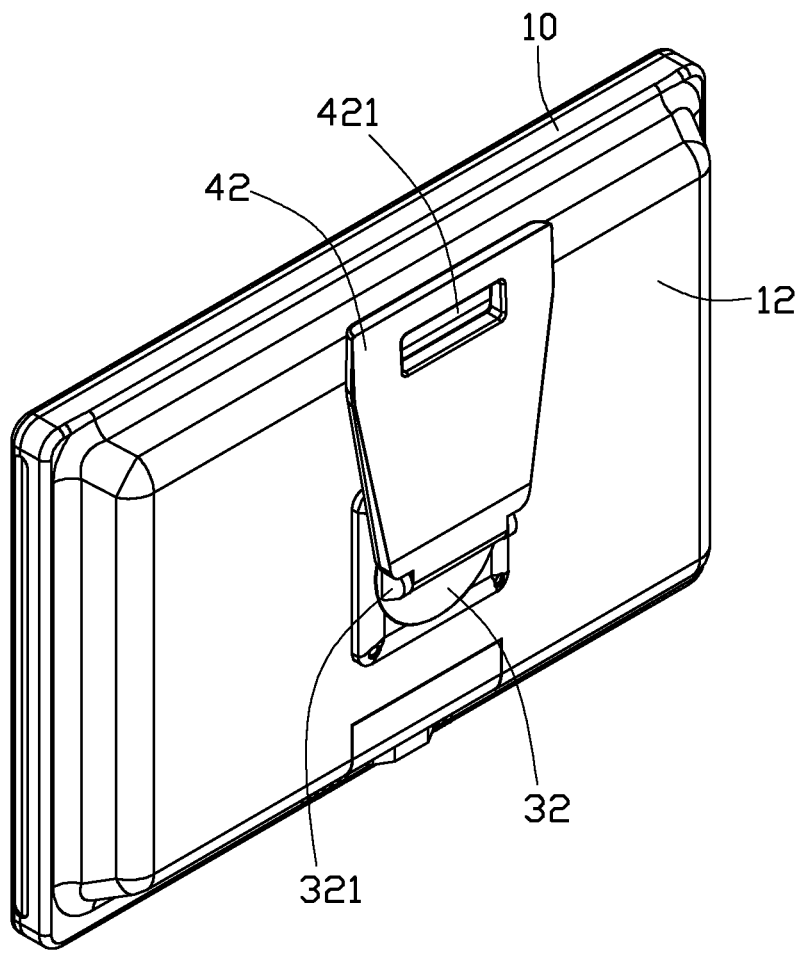
FIG. 4 is an assembled view of the all in one computer of FIG. 1, showing the support module rotated to a second position.

Referring to FIG. 4, the leg stand 40 can rotate 180 degrees from the first position to a second position where the longer base faces upwards. The leg stand 40 can be used as a handle that allows users to carry the all in one computer in the second position.

While the present disclosure has been illustrated by the description of preferred embodiments thereof, and while the preferred embodiments have been described in considerable detail, it is not intended to restrict or in any way limit the scope of the appended claims to such details. Additional advantages and modifications within the spirit and scope of the present disclosure will readily appear to those skilled in the art. Therefore, the present disclosure is not limited to the specific details and illustrative examples shown and described.

What is claimed is:

1. An all in one computer comprising:
    an enclosure comprising a rear panel; and
    a support module comprising a leg stand that is pivotally attached to the rear panel and rotatable about an axis perpendicularly to the rear panel, the leg stand comprising a shorter base and a longer base, an operation opening being defined in the leg stand and located adjacent to the longer base; wherein the support module further comprises a mounting piece securely attached on the rear panel and a connecting member pivotally attached to the mounting piece, and the leg stand is attached to the connecting member and rotatable together with the connecting member; a circular groove is defined in the mounting piece, and the connecting member comprises a circular main plate that is pivotably mounted in the circular groove;
    wherein the leg stand is rotatable between a first position where the longer base face downwards to support the enclosure, and a second position where the longer base face upwards for facilitating using the operation opening to carry the all in one computer.

2. The all in one computer of claim 1, wherein the connecting member further comprises a pair of tabs extending substantially perpendicular from the circular main plate; and the leg stand comprises a mounting portion protruding from the shorter base, and the mounting portion is attached to the connecting member and located between the pair of tabs.

3. The all in one computer of claim 2, wherein the connecting member further comprising a pair of flanges extending from the circular main plate, the pair of flanges is connected to the pair of tabs; and a mounting groove is located between the pair of tabs and the pair of flanges, and the mounting portion is mounted in the mounting groove.

4. The all in one computer of claim 3, wherein each of the pair of flanges comprises an arc shaped inner surface, and the mounting portion comprises an arc shaped outer surface corresponding to the arc shaped inner surface.

5. The all in one computer of claim 1, wherein the leg stand comprises a main body with the longer base and the shorter base, and the main body has an isosceles trapezoid shape.

6. The all in one computer of claim 5, wherein the longer base is parallel to and longer than the shorter base.

7. An all in one computer comprising:
an enclosure comprising a rear panel; and
a support module comprising a leg stand pivotally attached to the rear panel, the leg stand comprising a shorter base and a longer base, an operation opening being defined in the leg stand and located adjacent to the longer base; wherein the support module further comprises a mounting piece securely attached on the rear panel and a connecting member pivotably attached to the mounting piece, and the leg stand is attached to the connecting member and rotatable together with the connecting member; a circular groove is defined in the mounting piece, and the connecting member comprises a circular main plate that is pivotably mounted in the circular groove; wherein the leg stand is rotatable between a first position where the longer base faces downwards to support the enclosure, and a second position where the leg stand is rotated 180 degrees from the first position and the longer base faces upwards for facilitating using the operation opening to carry the all in one computer.

8. The all in one computer of claim 7, wherein the connecting member further comprises a pair of tabs extending substantially perpendicular from the circular main plate; and the leg stand comprises a mounting portion protruding from the shorter base, and the mounting portion is attached to the connecting member and located between the pair of tabs.

9. The all in one computer of claim 8, wherein the connecting member further comprising a pair of flanges extending from the circular main plate, the pair of flanges is connected to the pair of tabs; and a mounting groove is located between the pair of tabs and the pair of flanges, and the mounting portion is mounted in the mounting groove.

10. The all in one computer of claim 9, wherein each of the pair of flanges comprises an arc shaped inner surface, and the mounting portion comprises an arc shaped outer surface corresponding to the arc shaped inner surface.

11. The all in one computer of claim 7, wherein the leg stand comprises a main body with the longer base and the shorter base, and the main body has an isosceles trapezoid shape.

12. The all in one computer of claim 11, wherein the longer base is parallel to and longer than the shorter base.

* * * * *